United States Patent [19]

Brixius

[11] 4,369,065

[45] Jan. 18, 1983

[54] WATER BASED INK COMPOSITIONS USING ORGANIC ACID

[75] Inventor: Darryl W. Brixius, Upper Macungie Township, Lehigh County, Pa.

[73] Assignee: Tarkett AB, Ronneby, Sweden

[21] Appl. No.: 278,250

[22] Filed: Jun. 29, 1981

Related U.S. Application Data

[63] Continuation of Ser. No. 152,205, May 22, 1980, abandoned.

[51] Int. Cl.³ .............................................. C09D 11/14
[52] U.S. Cl. ....................................... 106/27; 264/52; 264/DIG. 82; 521/72; 427/373
[58] Field of Search ............... 106/27; 264/DIG. 82, 264/52; 252/321, 358; 521/72, 909; 427/373

[56] References Cited

U.S. PATENT DOCUMENTS 3,552,997 1/1971 Powell et al. .............. 264/DIG. 82
3,660,187 5/1972 Shortway et al. .......... 264/DIG. 82
4,083,907 4/1978 Hamilton .............................. 106/20

*Primary Examiner*—John Kight, III
*Assistant Examiner*—Amelia B. Yarbrough
*Attorney, Agent, or Firm*—Littlepage & Webner

[57] ABSTRACT

Organic carboxylic acid containing from 2 to 12 carbon atoms and having at least two carboxyl groups or at least one carboxyl group and one amino or hydroxy group or anhydride or halide of such acid is used in making aqueous, foam-growth-controlling printing ink composition for use in chemical embossing of heat-foamable and expandable resinous materials such as polyvinyl chloride.

20 Claims, No Drawings

4,369,065

WATER BASED INK COMPOSITIONS USING ORGANIC ACID

This is a continuation of application Ser. No. 152,205, filed May 22, 1980 now abandoned.

BACKGROUND OF THE INVENTION

Chemical embossing techniques have been used widely in industry in the manufacture of floor, ceiling, and wall coverings; desk, table and counter tops; coated and impregnated fabrics; and like articles, as more particularly described in U.S. Pat. Nos. 3,293,094, 3,293,108 and 3,458,337, the disclosures of which are incorporated herein by reference.

Such chemical embossing techniques have normally involved coating a base material, such as an asbestos sheet, with a substantially uniform layer of a resinous material such as polyvinyl chloride. A foaming or blowing agent, such as azodicarbonamide, is normally uniformly dispersed in the resinous material and is adapted, upon subsequent heating to a sufficiently elevated temperature, to decompose and to liberate gaseous decomposition products to expand and create the foamed, blown resinous product.

One aspect of such chemical embossing techniques has comprised the printing of selected, predetermined areas of the surface of heat-foamable resinous material, prior to the heating, with a foam-growth-controlling printing ink composition which is capable of affecting and changing the foam-growth of those selected, predetermined areas, when the heat-foamable resinous materials are subsequently heated to the required elevated temperature.

Such foam-growth-controlling printing ink compositions have contained either: (1) agents for inhibiting or suppressing the decomposition of the foaming or blowing agents to thus decrease the resulting expanding gaseous action on the foamable resinous materials and to correspondingly decrease the foam-growth in the selected, predetermined areas to which they are applied; or (2) agents for catalyzing or accelerating the decomposition of the foaming or blowing agents to thus increase the resulting gaseous action on the foamable resinous materials and to correspondingly increase the foam-growth in the selected, predetermined areas to which they are applied.

As a consequence, the surface of the resulting, foamed or blown resinous materials have been given an embossed or relief pattern effect containing relatively higher areas or lands and relatively lower areas or valleys, thus providing excellent surface texture.

The foam-growth-controlling printing ink compositions have thus contained both: (1) the foam-growth-controlling agents; and (2) the pigments, ink, dyes or other coloring materials, whereby the resulting embossed or relief pattern effects have been made to coincide very accurately and very precisely with the ink-printing pattern, thus creating excellent visual and tactile effects which are in substantially perfect alignment and registry at all times.

More specific details and particulars of such chemical embossing techniques may be found in the U.S. patents previously referred to herein and such details and particulars are incorporated herein by reference thereto.

Although a number of organic, solvent-based-foam-growth-controlling printing ink compositions have been used previously in such chemical embossing manufacturing techniques, and have proved to be relatively successful therein, it is always desired to improve upon existing commercial and industrial techniques. Organic solvent-based printing inks are relatively expensive, are usually very difficult to remove or clean from printing equipment, are occasionally not adaptable for use with conventional commercial printing equipment, are often flammable or have relatively low flash points which are unfortunately conducive to dangerous or hazardous conditions, frequently cause significant waste, ecological, or pollution problems, and sometimes required costly and time-consuming solvent-recovery programs.

U.S. Pat. Nos. 4,083,907 and 4,191,581 describe a water-based ink composition for use in chemical embossing using triazole foam-growth-controlling agents such as benzotriazole. Other, more acidic foam-growth-controlling agents such as trimellitic acid anhydride have been used in solvent-based ink compositions but have not been thought suitable for water-based ink compositions because of their high degree of acidity.

SUMMARY OF THE INVENTION

It is an object of the present invention to provide novel water-based ink compositions for use in chemical embossing processes of the type described above. To this end processes are provided for making such novel ink compositions using an organic carboxylic acid component and for using such ink compositions in chemical embossing.

In accordance with the invention, a process is provided for making aqueous, foam-growth-controlling printing ink composition of use in the chemical embossing of heat foamable and expandable resinous materials. The process comprises mixing together in an aqueous medium:
(a) at least one acid component selected from the group consisting of:
  (i) organic carboxylic acid containing from 2 to 12 carbon atoms and having at least two carboxyl groups or at least one carboxyl group and one amino or hydroxy group;
  (ii) anhydride of such acid; and
  (iii) acid halide of such acid;
(b) aqueous printing ink composition;
(c) basic neutralizing agent in an amount sufficient to neutralize the organic acid component; and
(d) pH controlling agent sufficient to maintain the pH of the foam-growth-controlling ink composition between about 8 and about 12.

A process is also provided for chemically embossing heat-foamable and expandable resinous material by applying to selected, predetermined portions of the surface of heat-foamable and expandable resinous material containing a foaming or blowing agent capable of causing said resinous material to grow and to expand upon heating, an aqueous, foam-growth-controlling printing ink composition having a pH of from about 8 to about 12 and being capable of controlling the growth and the expansion of said resinous material as a result of said heating, said foam-growth-controlling printing ink composition comprising the product of mixing together in an aqueous medium:
(a) at least one acid component selected from the group consisting of:
  (i) organic carboxylic acid containing from 2 to 12 carbon atoms and having at least two carboxyl groups or at least one carboxyl group and one amino or hydroxy group (ii) anhydride of such acid; and
(iii) acid halide of such acid;
(b) aqueous printing ink composition;
(c) basic neutralizing agent in an amount sufficient to neutralize the organic acid component; and
(d) pH controlling agent sufficient to maintain the pH of the foam-growth-controlling ink composition between about 8 and about 12;

and heating said heat-foamable and expandable resinous material, whereby said selected, predetermined portions to which said aqueous, foam-growth-controlling printing ink composition was applied attain heights differing from those other portions to which said aqueous, foam-growth-controlling printing ink composition was not applied.

Printing ink composition of the invention has a pH between about 8 and about 12 and comprises:
(a) basic salt of organic carboxylic acid containing from 2 to 12 carbon atoms and having at least two carboxyl groups or at least one carboxyl group and one amino or hydroxy group;
(b) aqueous printing ink composition; and
(c) pH controlling agent in an amount sufficient to maintain the pH of the foam-growth-controlling ink composition between about 8 and about 12.

In preferred embodiments of the invention, the neutralizing agent is ammonia or an amino compound. Optional ingredients include alcohol and additional water.

DETAILED DESCRIPTION OF THE INVENTION

The specific aqueous printing ink composition which is employed does not relate to the essence of the present invention, other than the fact that it must be aqueous. It can for instance be a pigment dispersion in a latex emulsion or solution. Water-soluble acrylic or melamine resins, for example, may be used. The remainder of the formulation of the printing ink composition is a solution. Suitable aqueous printing inks also include, for instance systems as described in U.S. Pat. No. 3,533,811 and U.S. Pat. No. 4,111,878, the disclosures of which are incorporated herein by reference. A more complete discussion of conventional resins and vehicles for aqueous inks may be found in an article entitled "Resins and Vehicles For Aqueous Inks" by Roger E. Burke (American Ink Makers, February, 1980).

Aqueous printing ink compositions are generally present in amounts of from about 30% to about 75% by weight, based on the total weight of the aqueous, form-growth-controlling ink compositions.

Inasmuch as a wide variety of aqueous printing ink compositions are commercially available and used as aqueous solutions or dispersions having specified concentrations of coloring materials expressed as solids therein, the actual or real solids content of the ink, pigment, dye or other coloring material is normally in the range of from about 3% to about 45% of the total weight of the foam-growth-controlling printing ink composition. Aqueous printing ink compositions which are commercially available with pH ranges of from about 8 to about 12 are preferred.

As indicated above, the invention provides for the making of aqueous, foam-growth-controlling ink compositions using at least one acid component selected from the group consisting of organic carboxylic acid containing from 2 to 12 carbon atoms and having at least two carboxyl groups or at least one carboxyl group and one amino or hydroxy group, anhydride of such acid and acid halide of such acid. The organic acid component is used for the purpose of providing suppressant for inhibiting or suppressing the decomposition of foaming or blowing agents such as azidocarbonamide in chemical embossing processes of the type mentioned above. While the mechanism by which the acid component provides the desired suppression is not fully understood, it is believed that the acid reacts with the neutralizing agent to form basic salt of the acid and that it is such salt which is actually present in the ink composition of the invention. Where acid anhydride or acid chloride is used this converts to the corresponding acid in the presence of the water so that the effect insofar as the invention is concerned is the same as if the corresponding acid had been used. It is also believed that, during use of the ink in chemical embossing processes, such salts may be converted to corresponding acid and/or acid anhydride. In any event, organic acid component is normally used in amounts between 1 and about 25 wt% based on total foam-growth-controlling ink composition. Suitable organic acids for use in the invention include for instance maleic, fumaric, adipic, malic, 1,2-phthalic, salicylic, trimellitic, pyromellitic, malonic, citric, anthranilic, oxalic, 2,6-dihydroxybenzoic, succinc, trimesic, isosebacic and glutaric, trans-1,2-diaminocyclohexane tetraacetic acid monohydrate, dihydroxytartaric, m-aminobenzoic, p-aminobenzoic, terephthalic, dl-mandelic, azelaic, 2,3-pyridinedicarboxylic, and ascorbic acid.

Suitable organic acid anhydrides include for instance maleic, phthalic, succinic, pyromellitic dianhydride, citraconic, pyrotartaric, dodecenyl succinic, trimellitic, tetrahydrophthalic, tetrachlorophthalic, hexahydrophthalic, 3,3', 4,4'-benzophenone tetracarboxyl dianhydride, 1,2:3,4-cyclopentanetetracarboxylic acid dianhydride, dichloromaleic anhydride, citraconic anhydride, bicyclo (2,2,1)5-heptene-2,3-dicarboxylic anhydride, cis-4-cyclohexene-1,2-dicarboxylic anhydride, 7-oxabicyclo (2,2,1) heptane-2,3-dicarboxylic anhydride, maleo-pimelic acid anhydride, pyrotartaric anhydride, glutaric anhydride, itaconic anhydride, 4-methyl-2-cyclohexane-1,2-dicarboxylic acid anhydride, tetrabromophthalic anhydride, 3-nitrophthalic anhydride, tetraiodophthalic anhydride, 3-chlorophthalic anhydride, 4-chlorophthalic anhydride, 4-methylphthalic anhydride, pyromellitic dianhydride.

Suitable acid halides include for instance trimellitic anhydride monoacid chloride, phthaloyl chloride, fumaryl chloride, terephthaloyl chloride, isophthaloyl chloride, terephthaloyl chloride, oxalyl chloride, succinyl chloride, adipyl chloride, sebacyl chloride, ethyl oxalyl chloride.

Preferred acid components of the invention include trimellitic, azelaic and p-aminobenzoic acids as well as the anhydrides and acid halides, especially chlorides, of such acids. Trimellitic acid anhydride is especially preferred.

Ink compositions of the invention also contain basic neutralizing agent in an amount sufficient to neutralize the organic acid component. The use of between about 1 wt% and about 25 wt% neutralizing agent based on total foam-growth-controlling ink composition is generally sufficient for this purpose.

Preferred neutralizing agents include ammonia, amines and alkylamino alcohols such as aminopropanol, diethylaminoethanol, di-methylaminoethanol, ethylaminoethanol, N, N dimethyl benzyl amine, trimethyl amine, triethyl amine, etc.

Care should be taken to maintain the pH of the aqueous-foam-growth-controlling printing ink compositions of the invention within the indicated pH ranges of from about 8 to about 12. This may be accomplished by the use of a pH controlling agent which may comprise additional amounts of neutralizing agent or may comprise a separate buffering agent. Buffering agents which are capable of creating or maintaining a pH in the range of from about 8 to about 12 include for instance boric acid-sodium tetraborate (borax) yielding a buffered pH of about 8.5, sodium tetraborate yielding a buffered pH of about 9.2, sodium bicarbonate-sodium carbonate yielding a buffered pH of about 10.2, disodium phosphate-sodium hydroxide yielding a buffered pH of about 11.5; etc. Where used, buffering agent is frequently present in amounts between about 1 and about 10 wt% based on total foam-growth-controlling ink composition.

In the event that ammonia or other relatively volatile material is used to establish or to maintain the desired pH range, care should be taken and additional amounts of the ammonia or other alkaline materials or the other relatively volatile materials should be supplied, if and when needed, to prevent the pH from dropping below a value of about 8.

As used herein, the term "ammonia" is not intended to include pure ammonia such as the pure gas or the compressed or cooled liquid ammonia ($NH_3$) but is intended to include solutions of ammonia in water, e.g., aqua ammonia having from about 25% to about 30% $NH_3$, or from about 24° to about 27° Baume.

It should be understood that the neutralizing agent required by the invention may be present entirely as a separately added ingredient in the foam-growth-controlling printing ink composition of the invention, or may included in whole or in part in the aqueous printing ink composition used in forming the composition of the invention.

Water is normally included in ink compositions of the invention in amounts of from about 10% to 40% in order to bring the consistency or the viscosity of the aqueous foam-growth-controlling printing ink composition to desired ranges for best handling by the printing equipment. Such viscosities may, for instance be in the range of from about 20 to about 60 seconds, Zahn 3 cup (i.e. between about 125 and about 500 centipoises), it being understood that more viscous compositions such as those having viscosities up to about 10,000 centipoises also frequently preferred. Desired amounts of water may be present in whole or in part as water used to form solutions or dispersions of other ingredients. Desired amounts of water may also, to the extent not present with other ingredients, be separately added during mixing of the foam-growth-controlling ink compositions of the invention. Water may for instance be present as water of solution for non-essential ingredients such as thickening agents or may be present in the aqueous printing ink compositions used.

Foam-growth-controlling printing ink compositions of the invention may be used in accordance with the process of the invention by applying same to selected predetermined portions of the surface of heat foamable and expandable resinous material containing a foaming or blowing agent as mentioned above. Suitable resinous materials, plasticizers, blowing agents, catalysts, pigments and other ingredients of heat formable and expandable resinous materials suitable for use in the invention include, for instance, those described in the above-mentioned U.S. Pat. Nos. 3,458,337, 3,293,094 and 2,293,108. Polymers of vinyl chloride including those mentioned in the above U.S. Patents are preferred.

If desired, water soluble or water dispersible alcohol may also be present in ink compositions of the invention. Where used, such alcohol is usually present in an amount of from about 1% to about 9% by weight, based on the total weight of the aqueous foam-growth-controlling printing ink compositions. Alkyl alcohol having from 1 to 6 carbon atoms is preferred. Suitable alcohols include for instance isopropanol, methanol, ethanol, 1-propanol, 1-butanol, 2-pentanol, hexanol, etc.

In forming foam-growth-controlling ink compositions of the invention, ingredients may be mixed by any suitable means using conventional mixing equipment. Acid, frequently in the form of powder, may be added to a previously formed mixture of neutralizing agent and aqueous ink or the acid may be preneutralized and then added to the aqueous ink.

The invention will be further illustrated in greater detail by the following specific Example. It should be understood, however, that although this Example may describe in particular detail some of the more specific features of the present invention, it is given for purposes of illustration and is not to be construed as limitative of the broader aspects of the present invention.

EXAMPLE

To evaluate the usefulness of several organic acid components in the practice of the invention the following foam-growth-controlling printing ink compositions were formulated:

| Ingredient | Parts By Weight For Ink Composition | | | | | | | | | |
|---|---|---|---|---|---|---|---|---|---|---|
| | A | B | C | D | E | F | G | H | I | J |
| American Ink | 100 | 100 | 100 | 100 | 100 | 100 | 100 | 100 | 100 | 100 |
| $NH_4OH$ | 30 | 40 | 20 | 40 | — | 55 | 30 | 30 | 55 | 20 |
| N,Ndimethylbenzylamine | — | — | — | — | 50 | — | — | — | — | — |
| Trimellitic Acid | 17 | — | — | — | — | — | — | — | — | — |
| Fumaric Acid | — | 9 | — | — | — | — | — | — | — | — |
| Anthranilic Acid | — | — | 11 | — | — | — | — | — | — | — |
| Trimellitic Anhydride | — | — | — | 15 | 15 | — | — | — | — | — |
| Phthalic Anhydride | — | — | — | — | — | 12 | — | — | — | — |
| Maleic Anhydride | — | — | — | — | — | — | 30 | — | — | — |
| Cyclohexane 1,2 dicarboxylic acid anhydride | — | — | — | — | — | — | — | 8 | — | — |
| Azelaic Acid | — | — | — | — | — | — | — | — | 15 | — |
| p-aminobenzoic acid | — | — | — | — | — | — | — | — | — | 11 |

The ingredient identified as American Ink was American Ink and Coatings Corp. No. 14484 W 18B black ink.

The mixing procedure in each instance was to preneutralize the acid with the neutralizing agent by stirring followed by addition of the neutralized acid to the ink with stirring. The inks were printed in patterns onto a standard gelled expandable polyvinyl chloride base coat and the base coat expanded using standard procedures. In each case satisfactory embossing was obtained.

While the invention has been described above with respect to certain preferred embodiments thereof, it will be apparent to those skilled in the art that various changes and modifications can be without departing from the spirit or scope of the invention.

What is claimed is:

1. Process for making aqueous, foam-growth-controlling printing ink composition of use in the chemical embossing of heat foamable and expandable resinous materials comprising:
   (a) preneutralizing at least one acid component selected from the group consisting of:
      (i) organic carboxylic acid containing 2 to 12 carbon atoms and having at least two carboxyl groups or at least one carboxyl group and one amino or hydroxy group;
      (ii) anhydride of such acid; and
      (iii) acid halide or such acid;
      with basic neutralizing agent in an amount sufficient to neutralize the acid component; and
   (b) mixing together in an aqueous medium;
      (i) said neutralized acid component;
      (ii) aqueous printing ink composition having a pH of from about 8 to 12; and
      (iii) pH controlling agent sufficient to maintain the pH of the foam-growth-controlling ink composition between about 8 and about 12.

2. Process according to claim 1 wherein the neutralizing agent is ammonia.

3. Process according to claim 2 wherein acid component is used in an amount between about 1 and about 25 wt% based on total foam-growth-controlling printing ink composition and ammonia is used in an amount between about 1 and about 25 wt% on the same basis.

4. Process according to claim 3 wherein water is present in an amount sufficient to adjust the viscosity of the foam-growth-controlling printing ink composition to desired levels.

5. Process according to claim 1 wherein the acid component comprises trimellitic acid.

6. Process according to claim 1 wherein the acid component comprises azelaic acid.

7. Process according to claim 1 wherein the acid component comprises p-aminobenzoic acid.

8. Process according to claim 1 wherein the said component comprises trimellitic anhydride.

9. Process according to claim 1 wherein the acid component comprises phthalic anhydride.

10. Process according to claim 1 wherein the acid component comprises cyclohexane 1,2-dicarboxylic acid anhydride.

11. Process according to claim 1 wherein the acid component comprises maleic anhydride.

12. Ink composition made according to the process of any of claims 1–11.

13. Aqueous, foam-growth-controlling printing ink composition of use in the chemical embossing of heat-foamable and expandable resinous materials having a pH between about 8 and about 12 and comprising:
   (a) basic salt of organic carboxylic acid containing from 2 to 12 carbon atoms and having at least two carboxyl groups or at least one carboxyl group and one amino or hydroxy group;
   (b) aqueous printing ink composition; and
   (c) pH controlling agent in an amount sufficient to maintain the pH of the foam growth controlling ink composition between about 8 and about 12.

14. Composition according to claim 13 wherein the salt is an amine salt.

15. Composition according to claim 14 wherein the salt is an amine salt of trimellitic acid.

16. Composition according to claim 14 wherein the salt is an amine salt of azelaic acid.

17. Composition of claim 14 wherein the salt is an amine salt of an p-aminobenzoic acid.

18. Composition according to claim 14 including water in an amount sufficient to adjust the viscosity of the foam-growth-controlling printing ink composition to desired levels.

19. Composition according to claim 14 wherein the neutralizing agent is ammonia.

20. Composition according to claim 19 wherein amine salt is present in an amount between about 1 and about 25 wt% based on total foam-growth-controlling printing ink composition and ammonia is present in an amount between about 1 and about 25 wt% on the same basis.

* * * * *